United States Patent
Shen

[15] 3,658,641
[45] *Apr. 25, 1972

[54] POLYMERIZATION PRODUCT OF UREA, EPICHLOROHYDRIN AND ALKYLENIMINE AND METHOD OF PREPARING SAME

[72] Inventor: Kwan-Ting Shen, Lakewood, N.J.
[73] Assignee: Ciba Corporation, Summit, N.J.
[ * ] Notice: The portion of the term of this patent subsequent to Sept. 17, 1987, has been disclaimed.
[22] Filed: Dec. 29, 1969
[21] Appl. No.: 888,960

Related U.S. Application Data

[63] Continuation-in-part of Ser. No. 810,837, Mar. 26, 1969, abandoned.

[52] U.S. Cl. .........................162/164, 260/2 EN, 260/77.5 C, 260/239 E
[51] Int. Cl. .................................................D21h 3/36
[58] Field of Search.............162/164; 260/2 EN, 239 E, 633, 260/77.5 C

[56] References Cited

UNITED STATES PATENTS 3,496,121   2/1970   Shen....................................260/2 EN Primary Examiner—S. Leon Bashore
Assistant Examiner—Richard H. Anderson
Attorney—Harry Goldsmith, Joseph G. Kolodny and Mario A. Monaco

[57] ABSTRACT

Polymerization products are provided which are obtained by initially preparing a condensate of 1-2 molar equivalents of urea and 1-2 molar equivalents of epichlorohydrin. The polymerization product is then obtained by polymerizing 2-30 percent by weight of the condensate with 98-70 percent by weight of an alkylenimine having one to four carbon atoms such as ethyleneimine. The polymerization products of this invention are especially useful as retention aids for particulate materials, as dye fixatives, and as drainage aids in paper manufacture.

9 Claims, No Drawings

3,658,641

POLYMERIZATION PRODUCT OF UREA, EPICHLOROHYDRIN AND ALKYLENIMINE AND METHOD OF PREPARING SAME

CROSS REFERENCE TO RELATED APPLICATION

This application is a continuation in part of my application, Ser. No. 810,837 filed Mar. 26, 1969 and now abandoned.

BACKGROUND OF THE INVENTION

1. Field of the Invention

This invention relates to new polymerization products which are useful in the manufacture of paper. More particularly, this invention is concerned with urea-epichlorohydrin-alkylenimine polymers and the process for obtaining said polymers.

2. Description of the Prior Art

In the manufacture of paper it is common to add dyes and particulate materials such as titanium dioxide, china clay and pigments to the paper furnish to color the paper, to fill and smooth the surface, to increase the opacity, to increase the whiteness, and for other purposes. The fibrous materials which are generally employed in the paper furnishes have little natural affinity for the certain dyes and particulate materials which are commonly employed. Since these dyes and particulate materials are generally relatively expensive, it is important that as high a percentage as possible be retained by the final product. In addition, a high percent retention facilitates the treatment of the white water and reduces the danger of water pollution when the white water is discharged.

In preparing certain grades of paper, the paper furnish is subject to a considerable amount of mechanical work such as beating or refining. However, this treatment also has the disadvantage of decreasing the freeness, which decreases the speed at which the paper can be formed.

Various different types of additives have been suggested to increase the retention of particulate materials and dyestuffs and also to increase the drainage rate. The additives heretofore suggested have not proven to be completely satisfactory since either the cost per pound of the paper produced was relatively high or the additives had an adverse effect on certain other properties.

It is one of the objects of this invention to provide a retention aid and drainage aid for paper manufacture which is relatively inexpensive in cost per pound of paper produced.

It is a further object of this invention to provide an economical and efficient process for manufacturing said retention aid and drainage aid.

SUMMARY OF THE INVENTION

It has been found that the polymers obtained by polymerizing together a condensate of urea and epichlorohydrin with alkylenimine are especially effective retention aids and drainage aids even when employed in relatively low concentrations.

DESCRIPTION OF THE PREFERRED EMBODIMENTS

The urea-epichlorohydrin condensates employed in the present invention are obtained by condensing approximately 1–2 molar equivalents of urea with about 1–2 molar equivalents of epichlorohydrin. The ratio of the urea to epichlorohydrin can be varied within the range noted above without substantially effecting the retention properties of the final product. However, it has been found that optimum properties are obtained if the molar ratio of urea to epichlorohydrin is about 2 to 1.

The urea-epichlorohydrin condensate may be satisfactorily obtained by various methods. One method which has considerable merit is to initially melt the urea and then add the epichlorohydrin dropwise to the molten urea. The preferred method, however, is to initially mix epichlorohydrin and urea at room temperatures and then gradually heat the mixture up to about 100° C. The mixture is maintained at this temperature until the molten mixture becomes clear and the accompanying exotherm subsides. The mixture is then heated to and maintained at a temperature of 115°–120° C., preferably about 117° C., for about 20–40 minutes. The mixture may be maintained at this temperature for longer periods, for example, up to 4 hours, without adversely effecting the properties of the final polymeric product. The mixture is cooled below 100° C. and then advantageously diluted to about 70–80 percent concentration with water to facilitate handling of the concentrate and cooled to room temperature.

The alkylenimines which may advantageously be employed in this invention have one to four carbon atoms. The alkylenimines are, for example, ethylenimine, propylenimine, 1,2-butylenimine and 2,3-butylenimine. Of all the alkylenimines, ethylenimine is clearly the important imine for employment in this invention, and accordingly, special attention is directed to it in this disclosure and the working examples.

The polymerization of the urea-epichlorohydrin condensate with the alkylenimine is advantageously conducted in the following manner: The alkylenimine is added to water to provide an aqueous solution of the alkylenimine. The temperature of the solution is held at about 30° C. during the addition. The initial mixing is somewhat exothermic, and accordingly, external cooling is required. The amount of water used to make the aqueous solution can be varied over wide limits. It is of some advantage, however, to perform the polymerization in a somewhat dilute polymerization medium. In practice it has been found that, when the alkylenimine solution contains about 20–30 percent alkylenimine, optimum process conditions are obtained. Further, since it is preferable to provide the final product in 20–30 percent concentrations for use in paper making processes, the adjustments of the concentrations of the final product are minimized.

After the alkylenimine solution has been prepared, the urea-epichlorohydrin concentrate prepared above is gradually added, preferably dropwise, to the alkylenimine solution. The temperature of the resulting mixture is held below 50° C., and preferably at about 30° C., during the addition of the condensate. The amount of the urea-epichlorohydrin condensate that is employed to obtain the polymers of this invention is between about 2 and 30 percent by weight of the alkylenimine. It is preferable, however, to use an amount of the condensate which is about 10 to 15 percent by weight of the alkylenimine.

After the addition of the urea-epichlorohydrin condensate is completed, the temperature of the mixture is raised to about 50° C. and maintained at this temperature for about 1 to 1½ hours. After this period, the mixture is heated to a temperature of 75° C. and maintained at this temperature until a 25 percent solution of the polymerization product at 25° C. has a Gardner viscosity between B and H and preferably between B and C. After the above-noted viscosity has been obtained, the resulting polymerization product is cooled to room temperature and the concentration of the product is adjusted.

While the above-described process is suitable for producing the polymerization products of this invention, it has been found that, if urea is included in the aqueous solution of alkylenimine before the addition of the urea-epichlorohydrin condensate, the urea acts as an agent to prevent gelling of the polymerization product. The urea is dissolved in the aqueous solution of the alkylenimine. The amount of urea added may be between 5 and 90 percent of the weight of alkylenimine, with amounts of urea between 30 and 40 percent giving the optimum results. The process including the urea is otherwise conducted in the manner described above. The additional urea is quite surprisingly effective as an antigelling agent in the present process, and the presence of the free urea does not adversely effect the retention properties of the polymerization product. The presence of the free urea also tends to increase the shelf life of the polymerization products.

The polymerization products of the present invention are water-soluble and, accordingly, may be added directly to the paper furnish. The polymerization products of this invention are effective as retention aids when added in amounts as low as oneeighth of a pound per ton of furnish. Using the normal amounts of particulate material or dyestuff, the optimum results are obtained when an amount between one-quarter to one-half pounds per ton of furnish is employed. If a larger amount of particulate material is added to the paper furnish, the relative amount of the polymerization product that is added is advantageously increased to an amount sufficient to significantly increase the percent retention.

When the polymerization produce is used as a dye fixative, the amount required is dependent to some extent on the particular dyes employed and the amounts. However, in most cases an amount equivalent to about one-eighth pound per ton of stock is sufficient.

The polymerization products of this invention are preferably added to the paper furnish after the dyestuff or particulate material has been added. The best results are obtained if the dyestuff or particulate material is initially dispersed throughout the furnish. The polymerization product is then added to the furnish and is thoroughly blended with the furnish. The effectiveness of the polymerization product can be simply checked by taking a sample of the furnish and draining the water from the sample. If the water is substantially clear, the retention is satisfactory. The polymerization product can also be added before the particulate material or dyestuff, or even simulraneously with the particulate material or dyestuff.

When the polymerization product is employed to increase the freeness of the paper furnish, it can be added at any point in the paper making process up to and including the head box. The amount required to increase the freeness will depend on a combination of how free the stock is as received and the desired amount of freeness. In general, an amount of about one-half pound per ton is satisfactory for this purpose.

The polymerization products of this invention are effective in low concentrations, which directly results in a lower cost per pound of paper produced. The polymerization products of this invention, when added in small amounts required to control the retention and increase the drainage, do not adversely effect the other properties of the final paper sheet.

The following examples are given in order to further illustrate the present invention, and are not intended to limit the scope of the subjoined claims. When parts are referred to in the following examples, it is to be understood to refer to parts by weight, not parts by volume.

EXAMPLE 1

A mixture of 60 g. of urea (1 mole) and 92.5 g. (1 mole) of epichlorohydrin were mixed together at room temperature. The mixture was gradually heated to about 100° C. and maintained at this temperature until the accompanying exotherm subsided and the molten mixture became clear. The temperature was raised to and maintained at 117° C. for about 40 minutes. After being cooled to 75° C, 21 g. of water were added with stirring to the resulting condensate.

An aqueous solution of ethylenimine was prepared by adding 1,520 g. of ethylenimine to 5,060 g. of water while maintaining the temperature below 30°C.

The urea-epichlorohydrin condensate prepared above was then added gradually to the ethylenimine solution while maintaining the temperature at about 30° C. The temperature was then allowed to gradually rise over 90 min. to 50° C., and held at this temperature for 30 min. Thereafter, the temperature was further raised to 75° C. until a 25 percent solution at 25° C. had a Gardner Holdt viscosity of B. The product was cooled to room temperature and the solid content adjusted to 25 percent. The product was a water-white, thin solution.

EXAMPLE 2

The procedure as described in Example 1 was repeated with the exception that the condensate was prepared from 90 g. of urea (1.5 moles) and 92.5 g. (1 mole) of epichlorohydrin, and the condensate was reacted with 30 percent aqueous solution of 1,820 g. of ethylenimine.

EXAMPLE 3

The procedure as described in Example 1 was repeated with the exception that the condensate was prepared from 120 g. of urea (2 moles) and 92.5 g. of epichlorohydrin (1 mole) and reacted with a 30 percent aqueous solution of 2,125 g. of ethylenimine.

EXAMPLE 4

The effects of the ratio of the urea to epichlorohydrin in the condensate on the properties of the final product were determined by comparing the retention properties of the products prepared in Examples 1, 2 and 3. The products of each of these examples only differ in the ratio of the urea and epichlorohydrin since equivalent amounts (10 percent) by weight of each of the condensates were reacted with the ethylenimine. The test was conducted by evaluating the percent retention of titanium dioxide by a wood pulp furnish.

| Example | Ratio urea-epichlorohydrin | % Retention ⅛ lb/ton | ¼ lb/ton | ½ lb/ton |
|---|---|---|---|---|
| 1 | 1.0:1 | 49.1 | 59.1 | 88.5 |
| 2 | 1.5:1 | 49.8 | 70.8 | 88.0 |
| 3 | 2.0:1 | 47.8 | 80.4 | 88.4 |

From the above it can be seen that at the higher level, ½ lb/ton, all were equally effective. However, at the intermediate level, the 2:1 urea to epichlorohydrin product was definitely superior.

EXAMPLE 5

In order to determine the effect of the percentage of the condensate in the polymerization product, the process as described in Example 1 was followed with the exception that the polymerization products were prepared containing different ratios of condensate and ethylenimine. The resulting products were evaluated with regard to retention of titanium dioxide using wood pulp as the furnish.

| % condensate in polymerization product | % retention of TiO₂ ⅛ lb/ton | ¼ lb/ton | ½ lb/ton |
|---|---|---|---|
| 2% | 36.2 | 49.0 | 79.5 |
| 5% | 38.1 | 52.0 | 85.1 |
| 10% | 49.1 | 59.6 | 88.5 |
| 15% | 43.0 | 59.9 | 88.0 |
| 20% | 36.0 | 70.0 | 85.3 |
| 30% | 41.0 | 66.0 | 84.0 |
| 50% (product gelled) | | | |

EXAMPLE 6

540.9 g. of urea and 832.5 g. of epichlorohydrin were mixed thoroughly and heated to 100° C. over a period of one-half hour. The temperature was kept at 100° C. until the mixture is clear and the exothermic reaction subsided. The temperature was then raised to 117° C. and maintained for one-half hour. After the reaction mixture was cooled below 100° C., 343.4 g. of water were added, and the solution was set aside.

756.3 g. of urea were dissolved in 3,934.7 g. of water. To this solution were added 1,892 g. of ethylenimine (44 moles) over 10 minutes while maintaining the temperature at 30° C. with an ice bath. 236.5 g. of the above concensates and 2,640 g. of water were mixed and added to the reaction mixture over 2 hours at 30° C. When the addition was complete, the reaction temperature was allowed to raise to 50° C. in about 1¼ hours. The temperature was kept at 50° C. for one-half hour and then allowed to raise to 75° C. The reaction mixture was maintained at 75° C. until its Gardner Holdt viscosity reached B–C at 25° C. and then cooled. The final product weighing 9,460 g. was a clear colorless thin solution with a pH of 10.9, solids content 27.7 percent.

EXAMPLE 7

The effects of the urea on the properties were determined by preparing samples in accordance with the general procedure outlined in Example 6. The products were tested by evaluating the retention of TiO₂ by a wood pulp paper.

| % condensate in product | % urea based on ethylenimine | % retention TiO₂ ⅛ lb/ton | ¼ lb/ton | ½ lb/ton |
|---|---|---|---|---|

| 15% | 30 | 23.0 | 48.0 | 82.0 |
| 15% | 50 | 21.0 | 47.0 | 77.0 |
| 15% | 70 | 17.0 | 38.0 | 71.0 |
| 15% | 100 | 14.0 | 31.0 | 65.0 |

The second optional addition of urea added to prevent gelling appears to act as a diluent with regard to the effectiveness of the polymerization product.

EXAMPLE 8

A mixture of 60 g. of urea and 46 g. of epichlorohydrin were mixed together. The mixture was raised to 100° C. and maintained at this temperature for 30 min. and then raised to 120° C. for 60 min. The condensate thus formed was cooled and diluted with 25 g. of water. A 30 percent aqueous solution of 1,000 g. of propylenimine was prepared while maintaining the temperature below 30° C. The condensate was added to the aqueous solution over about 3 hours while maintaining the mixture at about 30° C. After the addition was completed, the reaction temperature was allowed to gradually rise to about 50° C. over an 80 min. period. It was held at 50° C. for 30 min. and then raised to 75° C. and maintained at this temperature until a product was obtained which is a 25 percent aqueous solution having a Gardner Holdt viscosity at 25° C. of B–C.

EXAMPLE 9

Example 8 was repeated except 2,3-butyleneimine was employed in place of propylenimine.

EXAMPLE 10

The retention properties of each of the products of Examples 1, 8 and 9 were compared to determine the effect of the particular imine on the product properties.

| Example | Imine | % Retention TiO$_2$ | | |
|---|---|---|---|---|
| | | ⅛ lb/ton | ¼ lb/ton | ½ lb/ton |
| 1 | ethyleneimine | 49.1 | 59.1 | 88.5 |
| 8 | propylenimine | 36.4 | 42.0 | 71.0 |
| 9 | 2,3-butylenimine | 29.8 | 38.7 | 61.2 |

EXAMPLE 11

120.2 g. of urea [2 moles] were gradually heated to 135° C. [melt]. Next, 370.0 g. of epichlorohydrin [4 moles] were added slowly over the next 3 hours with stirring, while maintaining the temperature of the exothermic reaction at 135° C. with occasional cooling. The mixture was stirred at 135° C. for one-half hour longer, then cooled to 70° C. and discharged. 34.4 g. of urea was dissolved in 181.0 g. of water. To this solution was added 86.0 g. ethylenimine [2 moles] quickly while maintaining the temperature at 30° C. with an ice bath. 8.6 g. of the above condensates and 120.0 g. water were mixed and added to the reaction mixture over two hours at 30° C. When the addition was complete, the reaction temperature was raised to 75° C. and maintained there until the Gardner Holdt viscosity reached B–C at 25° C. The reaction was cooled to room temperature and discharged. The final product weighing 430 g. is a clear colorless thin solution with a pH of 10.7, solids content 28.2 percent.

EXAMPLE 12

120.2 g. of urea [2 moles] and 370.0 g. epichlorohydrin [4 moles] were mixed thoroughly and heated to 95° C. The temperature was kept at 95° C. for 2 hours. The temperature was slowly raised to 100° C. over the next 2 hours, and held there until the reaction became clear and exotherm stopped. The temperature was raised to 117° C. and maintained for one-half hour, then cooled to 95° C. and discharged.

The polymerization of ethylenimine with the above prepared condensate and extra urea was prepared as described in Example 11 using the same weights of materials. The final product weighing 430 g. was a clear, colorless, thin solution, having a Gardner Holdt viscosity of C at 25° C., a pH of 10.8, solids content 28.2 percent.

The products of Examples 11 and 12 were tested by evaluating the retention of TiO$_2$ by a wood pulp paper.

| Example | Percent condensate in product | Percent urea based on ethylenimine | Percent retention TiO$_2$ | | |
|---|---|---|---|---|---|
| | | | 1/8 lb./ton | 1/4 lb./ton | 1/2 lb./ton |
| 11 | 10 | 40 | 63.0 | 76.0 | 81.0 |
| 12 | 10 | 40 | 56.0 | 72.0 | 75.0 |

I claim:

1. The water-soluble polymerization product of about (a) 2–30 percent by weight of a condensate of 1–2 molecular equivalents of urea and 1–2 molecular equivalents of epichlorohydrin and (b) 98–70 percent by weight of an alkylenimine having two to four carbon atoms and having a Gardner Holdt viscosity in a 25 percent aqueous solution at 25° C. of between B and H.

2. The polymerization product according to claim 1 of about 85–90 percent by weight of said alkylenimine and about 15–10 percent of said condensate.

3. The polymerization product according to claim 2 wherein said alkylenimine is ethylenimine.

4. The polymerization product according to claim 3 wherein said condensate is the condensation product of 2 molar equivalents of urea and 1 molar equivalent of epichlorohydrin.

5. The polymerization product according to claim 1 having a Gardner Holdt viscosity in a 25 percent aqueous solution at 25° C. of between B and C.

6. The process for the preparation of the polymerization product according to claim 1 comprising condensing 1–2 molar equivalents of urea with 1–2 molar equivalents of epichlorohydrin to provide a condensate, and polymerizing 2–30 percent by weight of said condensate with 98–70 percent of said alkylenimine in an aqueous polymerization medium at about 50°–75° C. until a 25 percent aqueous solution of the resulting product at 25° C. has a Gardner Holdt viscosity between B and H.

7. The process according to claim 6 wherein the aqueous polymerization medium contains 5–90 percent by weight of urea based on the weight of the alkylenimine.

8. A method of forming paper wherein the retention of particulate materials and dyestuffs is improved which comprises adding a retention effective amount of the polymerization product according to claim 1 to a paper furnish which contains said particulate materials and dyestuffs, and forming paper from said furnish.

9. The method according to claim 8 wherein one-eighth to one-half pound of the polymerization product of this invention is added per ton of paper furnish.

* * * * *